C. W. BALDWIN,
Assignor to E. L. STURTEVANT.
Magazine Fire-Arm.
No. 8,963. Reissued Nov. 11, 1879.
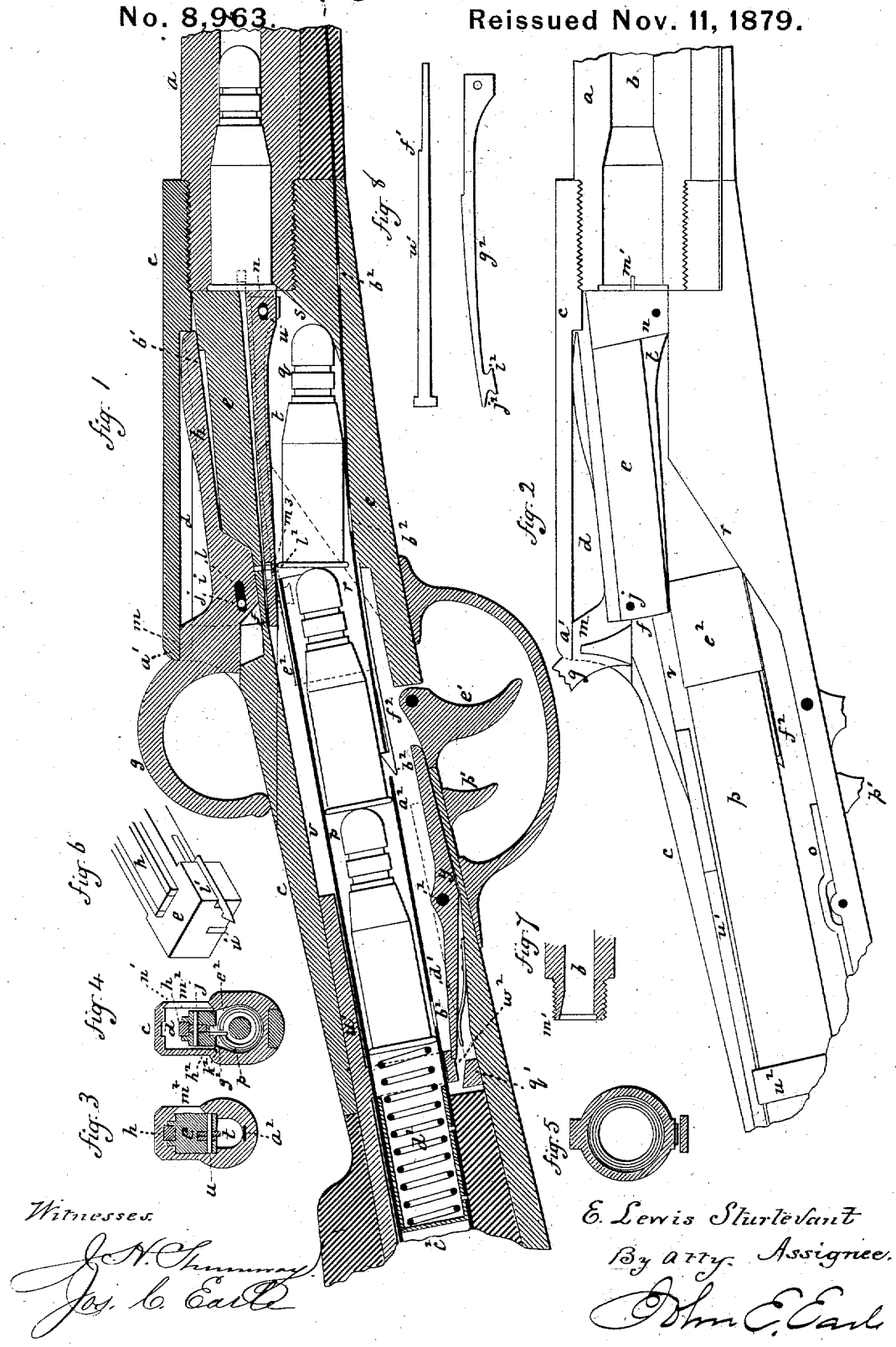
Witnesses.
J. N. Shumway
Jos. C. Earle
E. Lewis Sturtevant
By atty. Assignee.
Wm. E. Earle
N. PETERS, PHOTO-LITHOGRAPHER, WASHINGTON, D. C.

UNITED STATES PATENT OFFICE.

E. LEWIS STURTEVANT, OF SOUTH FRAMINGHAM, MASSACHUSETTS, ASSIGNEE OF CYRUS W. BALDWIN.

IMPROVEMENT IN MAGAZINE FIRE-ARMS.

Specification forming part of Letters Patent No. 85,897, dated January 19, 1869; Reissue No. 8,963, dated November 11, 1879; application filed March 31, 1879.

*To all whom it may concern:*

Be it it known that CYRUS W. BALDWIN, of Boston, in the county of Suffolk and State of Massachusetts, invented a new and useful Improvement in Magazine Fire-Arms; and I do hereby declare the following, when taken in connection with the accompanying drawings, and the letters of reference marked thereon, to be a full, clear, and exact description of the same, which said drawings constitute part of this specification, and represent, in—

Figure 1, a vertical central and longitudinal section; Fig. 2, an elevation of its interior working parts; Figs. 3, 4, and 5, vertical and transverse sections of the arm; Fig. 6, a perspective view of a portion of the movable breech; Fig. 7, a section of the rear end of the barrel; Fig. 8, a top view of the exploding-bolt, to be hereinafter described.

This invention is an improvement in that class of breech-loading fire-arms carrying metallic cartridges, and known as "magazine or repeating arms," the arm, as constructed, being susceptible of use as a "single loader," so termed, the object of this invention being to secure great simplicity of construction, combined with ease and accuracy in manipulation and effectiveness and durability in operation.

The invention consists in the employment of a longitudinally-sliding breech-block moving in an inclosure or chamber made in the frame or receiver of the arm in rear of the barrel and in axial alignment with the bore thereof, the disposition of the said breech-block being such that when drawn back or retracted to its farthest limit of movement it allows a cartridge from the magazine below it to precede it, and when pushed forward to its extreme position it performs the function of forcing the cartridge along in advance of it, of introducing such cartridge into its chamber within the barrel, and of closing the rear end of and forming a breech thereto, the block being provided with a suitable device for automatically locking it in its closed position, and enabling it to sustain the force of the explosion of the charge.

The invention further consists in the employment and disposition of an inclined plane or inclined planes, upon which the cartridge ascends by the force of a coiled spring or other device until it attains a sufficient elevation to be struck by the advance of the sliding breech and carried by it to the barrel.

The invention further consists in combining, with the movable breech and its operative parts, a device for exploding the cartridge, the same to be hereinafter described.

To enable others conversant with fire arms to make and use my invention, I will describe its construction and operation.

In the drawings, *a* denotes the barrel, and *b* its bore; *c*, the frame for containing the operative parts. This frame is hollow or formed with a longitudinal chamber, *d*, open at rear end and in axial line with the bore of the barrel. Within this chamber is an elongated block, *e*, the two being of equal length, or so that when the bloen *e* is in its place it shall extend from the rear end of the chamber *d* to the rear end of the barrel, and form the recoil-block or breech-piece of the arm. The said rear end of the chamber is formed with an abutment or ledge, *f*, to retain the said breech-block firmly in place.

For the purpose of effecting the necessary backward and forward movements of the breech-block *e*, I employ a handle, *g*, formed upon the rear end of a bolt or bar, *h*, which slides within a groove, *i*, made in the upper face of the breech-piece, and nearly its entire length, the bolt being retained within the groove by a transverse pin, *j*, passing through the breech-piece and slot *l* in the bolt, this slot allowing of a short reciprocating movement of the bolt within the block. On the bolt, and immediately in front of the handle *g*, is a shoulder, *m*, which, when the breech is in the position against the barrel, extends underneath a corresponding point, *a'*, of the breech-chamber *d* and prevents the rear end of the breech-block from rising above its supporting-abutments *f*, before mentioned.

When it becomes desirable to retract the breech-block in the act of loading the arm the hook is seized and drawn back a short distance, which will remove its shoulder *m* from under its stop *a'*, the length of the slot *l* before mentioned permitting this movement, the forward end of the bolt *h* at this point sinking into a depression, $b'$, made in the bottom of the groove $i$, and by this means leaving room between the breech-block and the top of its chamber for raising of the rear end of the block therein. At this point the hook, and with it the rear end of the breech, is to be raised, with the front upper corner of the breech as a fulcrum or turning-point, and the rear end of the breech raised from contact with its ledge or abutment $f$, when the combined hook and breech are to be drawn back to their extreme rearward position, which is determined by a projection, $n$, depending from the front end of the breech-block, and which brings up against the abutment $f$.

The magazine or tube, or a portion thereof, for containing the cartridges is shown at $p$ as extending through the stock of the gun and communicating with a cartridge-receiving trough, $q$, formed below the breech-chamber, and in alignment therewith, the sides of the rear portion of the trough $q$ being provided with an inclined ledge or ledges, $r$ $r$, upon which the flange of the cartridge rests, the forward terminus of the trough, or that supporting the ball, also being inclined, as shown at $s$.

The spring or other device for advancing the cartridge has the effect of forcing the foremost one a short distance up the inclined planes $r$ $r$ and $s$, and in advance of and into the path of movement of the breech-block when the latter is retracted. One device which I have contemplated for thus forcing the cartridges along consists of a long thin ribbon or plate of steel or other metal, $a^2$, lying within a slot in the lower part of the cartridge-magazine, and punctured, as at $b^2$ $b^2$, the distance of such openings $b^2$ $b^2$ from one another being equal to the extreme length of a cartridge. This ribbon $a^2$ is secured to the under side of a short tube, $c^2$, which slides freely within the cartridge-magazine $p$, a coiled spring, $d^2$, being arranged within this tube, and projecting, when in an extended state, somewhat beyond the forward end thereof, as shown in Fig. 1 of the drawings, the said spring pressing against the last of the series of cartridges within the magazine.

A tubular sleeve, $e^2$, encompasses the cartridge-magazine $p$, and so as to slide freely thereon, such sleeve having affixed to its lower part a spring-catch or hook, $f^2$, for taking into the openings $b^2$ of the feeding-ribbon and advancing the cartridges.

The said tubular sleeve is worked backward and forward by a hooked and notched bar, $g^2$, (shown in dotted lines in Fig. 1 and detached in Fig. 9,) with a hook, $i^2$, for advancing the sleeve and its spring-catch, and with a catch or notch, $j^2$, for retracting such sleeve and catch, according as the breech-block $e$ may be advanced or retracted, the said hook or rear end of the bar $g^2$ extending into a short slot or aperture, $k^2$, made in the upper side of the sleeve $e^2$.

As the breech-block is drawn back preparatory to loading the arm, the catch $j^2$ of the bar $g^2$, by means of the aperture $k^2$, forces back the sleeve $e^2$ and its spring-catch $f^2$, such spring-catch, when the breech arrives at its extreme rearward position, taking into one of the series of notches $b^2$ of the feeding-ribbon $a^2$.

In this construction of the arm the spring $d^2$, which, as before described, is pressing against the rearmost cartridge, forces all the cartridges forward, the foremost rising, as it advances, into a position forward of the breech-piece. Then as the breech-block is moved forward, forcing the foremost cartridge into the barrel, the spring-catch $f^2$ also advances the sleeve $e^2$. and with it the feeding-ribbon $a^2$, the spring $d^2$ of which, by pressing against the rear cartridge of the series, serves to advance the whole of them within the magazine and toward the barrel, and again compresses the spring $d^2$. It will be found in practice, I think, that this spring will have the effect of throwing the cartridge entirely into the barrel in advance of the breech-piece.

The above-described device for advancing the cartridges constitutes a positive mechanism, and in many respects may be considered preferable to the ordinary spiral spring now generally employed in magazine fire-arms for advancing the cartridges.

Although, in itself considered, the use of the feeding-ribbon is not new, and is used in other arms, I show its operation in connection therewith.

As soon as the breech-block brings up against the end of the barrel, or against the flange of the cartridge inclosed between the two, a slight downward pressure is exerted upon the handle, which has the effect of depressing the rear end of the breech-piece into its position in front of the abutment $f$. This downward pressure upon the hook also has the effect of elevating the forward end of the bolt $h$ from out of the depression $b'$, before mentioned, and permits the hook to be pushed forward to its fullest extent, and its shoulder forced under the stop $a'$, the above-mentioned depression of the breech-block locking it in position against the barrel by extending in front of the abutment $f$.

The firing-pin for exploding the cartridge is shown at $t$ as a bar of a length about equal to that of the breech, to the projection $n$ of which it is pivoted by a bolt, $u$, the bar extending alongside the bar $g^2$ and partially into the groove $h^2$, before mentioned as made in the under side of the breech-block. The firing-pin $t$, besides serving the purpose of exploding the cartridge, also, in combination with the bar $g^2$, lies upon the top of the next cartridge in the series within the magazine, and serves to maintain such cartridge within its trough $q$ until the breech-block has passed over and to the rear of it.

The lock or discharging mechanism of the arm consists of a hammer $u'$, sliding freely in a groove, $v$, made in the upper part of the receiver and over the magazine $p$, the forward end of the hammer striking against the rear end of the firing-pin $t$, the rear end of the hammer being provided with a spring or other device suitably arranged for projecting it suddenly forward at the proper time.

A ring, $w^2$, depends from the hammer $u'$ at or near its center, such ring encircling the magazine $p$, over which it freely slides, and operating in connection with a tipping-lever, $y$, pivoted at about its middle to the lower part of the receiver and below the magazine, as shown at $z$ in the drawings, the said ring $w^2$ and lever $y$ serving the same purpose as the tumbler and sear of an ordinary fire-arm lock—that is to say, as the hammer $u'$ is retracted, by means hereinafter described, to its farthest extent, the rear end of the lever $y$ is forced upward in front of the ring by a spring, $d'$, suitably applied to such lever, and operates to set or cock the hammer $u'$, which is released or discharged by a trigger, $e'$, constructed and applied as in ordinary fire-arms, and by pulling which the inner end of the bolt or sear $y$ is elevated and its rear depressed and removed from contact with the ring or tumbler $w^2$, thus allowing the spring to act, and force the hammer forward against the firing-pin.

The retraction or rearward movement of the hammer is effected by the bar $g^2$, which, during the rearward movement of the breech-block, abuts against a shoulder, $f'$, of the hammer $w'$, the bar $g^2$ passing by the forward end of the hammer without actuating it, the object of this being to compensate for the greater distance traveled by the firing-pin in comparison with that required to cock the hammer.

The device for extracting the spent or exploded shell of the cartridge consists simply of a hook or catch-bar, $l'$, pivoted to one side of the forward end of the movable breech $e$, as shown in Fig. 6, the hooked end being forced inward and in front of the flange of the cartridge-case by an inclined groove, $m'$, cut in the breech end of the barrel, or the cartridge-chamber thereof, as shown in Fig. 2, and also in Fig. 7, which is a horizontal section of the rear end of the barrel. As the breech is retracted the hook $l'$ seizes the exploded shell and draws it backward, the shell being discharged from the arm by any suitable device through a lateral opening, $m^2$, made in the receiver, this opening $m^2$ being closed by a gate, $n'$, affixed to the side of the breech-block and moving with it. It will be seen that, as the forward end of the breech turns upon its upper corner as a fulcrum, when its rear end is elevated it becomes a powerful lever to start the cartridge-shell a short distance in withdrawing it from the barrel.

The device for locking the trigger against accidental or premature explosion of the charge consists of a sliding plate, $o$, affixed to the lower part of the breech-chamber and upon one side of the sear $y$, as represented. The plate $o$ is provided with a knob, $p'$, which extends through a slot made in the under part of the frame. Upon pushing forward the knob $p'$ the rear end of the plate $o$, or a right-angular bend, $q'$, thereof, will pass below the rear end of the sear $y$ and lock the trigger, so as to prevent explosion of the charge.

Preparatory to operating the arm the magazine is supplied with a plurality of cartridges, which are inserted therein by passing them, in succession, through the opening $m^2$ in the side of the frame, and dropping them into the front end of the magazine $p$, the breech-piece being drawn back for the purpose.

The operation of the arm is as follows: When the operator desires to introduce a cartridge into the barrel, he seizes the handle $g$ and draws it back till it is released from the stop $a'$, when he slightly elevates the handle and rear end of the breech-piece, or sufficiently so to raise the latter from contact with the abutment $f$. Then he draws the whole back to the extreme rearward position, the hammer by this movement being cocked, as before explained. At this point the forward cartridge of the series is forced forward by the spring, as before described, or other device for actuating them, and lies in position, with the upper portion of its flange in front of the breech-block. The operator then pushes the breech-piece forward till it strikes against the cartridge and forces it up the inclined planes $r$ $r$ and $s$ and into the barrel, a slight downward pressure being exerted upon the handle, which has the effect of depressing the rear end of the breech-piece into its chamber. The shoulder $m$ of the hook, by the same movement, is brought forward into place below the stop $a'$, and locks the breech-piece securely in place against the barrel, and closes the rear end thereof. As the breech-piece reaches its position against the end of the barrel, the hook $l'$, by the action of the inclined groove $m'$, is forced in front of and so as to impinge against the flange of the cartridge. The trigger is then pulled and the hold of the sear $y$ upon the annular thimble $w^2$ removed, which allows the hammers $u'$ to be forced forward by the action of its spring, and explode the charge by striking the firing-pin and driving it against such cartridge, the firing-pin serving the purpose, during the forward movement as well as rearward movement of the breech-piece, of keeping the next succeeding cartridge of the series in its proper place within its trough. On drawing back the breech-piece a second time, the hook $l'$ seizes the empty shell and withdraws it from the barrel, the shell being retracted until its flange strikes against a stud properly situated within the frame, when it is deflected through the passage or orifice $m^2$, before mentioned, and expelled from the arm.

The arm above described may be converted into a breech-loader by the employment of a spring or pin disposed so as to press upon the foremost cartridge and retain it within its trough while the breech-piece moves over it, the cartridge also serving to support a cartridge while being inserted within the barrel by a person's hand, such cartridge being introduced through the orifice in the side of the receiver.

By the device of a divided firing-pin the arm is also capable of conversion to the use of a center-fire cartridge, and may be constructed with equal facility for either a central or rim fire cartridge.

In order to prevent possibility of premature explosion of the charge by the firing-pin coming in contact with the fulminate of the cartridge in the act of pushing the breech-block forward into place, I form in the upper surface of the rear end of the firing-pin a short notch, $l^2$, and I secure to the lower part of the bar $h$ of the handle $g$ a pin, $m^3$, which extends into this notch, and so disposed therewith that upon drawing back the bar $h$ the pin $m^3$, acting upon the firing-pin, retracts it a short distance within the breech-piece, and so that it shall not touch the cartridge, as the breech is forced into place against the barrel, until it is struck by the hammer.

I would remark that in place of the exact form and arrangement of the breech-piece with respect to the receiver and the barrel, as shown in the accompanying drawings, I have contemplated forming it in the shape of a round bolt, and having a coupling arrangement between it and the rear end of the chamber $d$ similar to that of many hose-couplings now in use—that is, the rear end of the breech piece or bolt has a projecting ring turned upon it, this ring having two quadrantal openings cut from its opposite sides, the opening in the end of the breech-chamber being formed to correspond to the shape of this notched ring. As the breech is forced forward into its place against the barrel it is given a quarter of a revolution, which locks or couples it to the receiver of the arm.

I claim as my invention, and desire to secure by Letters Patent of the United States, as follows:

1. In a magazine fire-arm, the combination, substantially as described, of the following elements: first, a barrel open at the breech; second, a breech-piece arranged to be moved longitudinally to and from said barrel to close or open the said breech; third, a magazine below said breech-piece in rear of and opening toward said barrel, said parts being arranged so that drawing back the breech-piece opens the mouth of the magazine to permit the introduction of cartridges thereto through the space occupied by the breech-piece in its closed condition.

2. In a magazine fire-arm, the combination, substantially as described, of the following elements: first, a barrel open at the breech; second, a breech-piece arranged to be moved longitudinally to and from said barrel to close or open the said breech; third, a magazine below said breech-piece in rear of, inclined, and opening toward said barrel; fourth, a spring in said magazine, the said parts arranged and operating so that when the breech is opened the foremost cartridge will be forced forward and upward by said spring into a position in front of said breech-piece when the breech-piece is moved forward to close the breech.

3. In combination with the firing-pin $t$ and bolt $g^2$, arranged in the bolt, as described, the exploding-bolt $u$, in manner as explained.

4. The lock of the arm, as composed of the bolt $w'$, the annular tumbler $w^2$, and the lever or sear $y$, the bolt being provided with a suitable spring, and both tumbler and sear operating in connection with the firing-pin $t$ and trigger $e'$, in manner as before described.

E. LEWIS STURTEVANT,
*Assignee of Cyrus W. Baldwin.*

Witnesses:
GEO. HEATON,
O. B. MOWRY.